Aug. 12, 1930.    J. W. ROCKEFELLER, JR    1,772,913
BATHROOM SCALE
Filed March 4, 1927
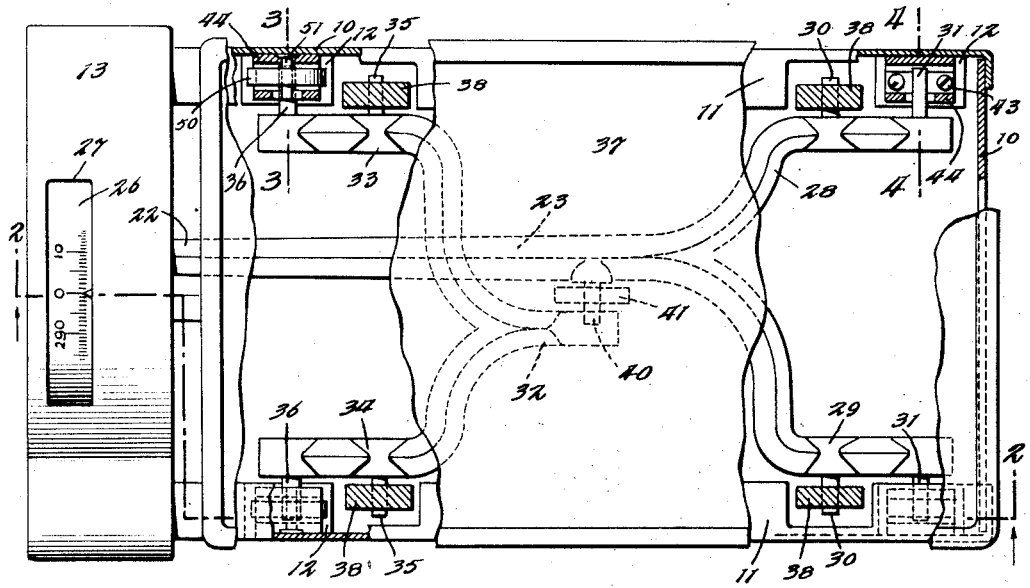
INVENTOR.
JOHN W. ROCKEFELLER JR.
BY J.S. Wooster
ATTORNEY Patented Aug. 12, 1930

1,772,913

UNITED STATES PATENT OFFICE

JOHN W. ROCKEFELLER, JR., OF NEW YORK, N. Y., ASSIGNOR TO JOHN CHATILLON & SONS, OF NEW YORK, N. Y., A CORPORATION OF NEW YORK

BATHROOM SCALE

Application filed March 4, 1927. Serial No. 172,624.

This invention relates to scales and has particular reference to improvements in the type of scales known as bathroom scales which rest upon the floor with the dial in close proximity to the platform and readable from above by a person standing on the platform.

An object of the invention is to simplify the arrangement, construction, and assembly of the bearings for the scale lever system so as to make them more compact and less liable to be tampered with by the users of the scales.

Another object is to improve the construction of the dial drums which support the scale strips so that the strips can be readily and accurately mounted thereon even though they vary slightly in length.

The scale construction in general comprises a low platform resting on a lever system pivotally mounted on bearings fastened to a base. The lever system is constructed to actuate a dial drum on the periphery of which a scale strip is fastened. The dial drum is housed within a head adjacent the platform and has a slot in the top through which the scale strip can be observed by a person standing on the platform and looking downward. In the manufacture and assembly of the scale strips it is found that they are not always of exactly the same length due to expansion or shrinkage. In order to permit the strips to be readily fastened to the drum even though of slightly variable length the periphery of the drum is provided with a surface of varying diameter preferably by making it slightly tapered or bevelled so that whatever the length of the strip it will find a snug seat on the drum by being slid thereon until it finds the right diameter of the peripheral surface. The strip can be fastened to the drum in any desired manner as by cementing, and is of course cut and assembled to have a tapered outline to correspond with the taper on the dial drum.

The construction also comprises a scale made with flanges at the location of the bearings to form a snug housing for the bearing units which are disposed therebetween. A bearing element is disposed within each unit and is engaged by a cooperating element on the lever system which generally projects into one side of the unit. To hold the unit firmly in position on the base it is engaged by fastening elements on the base engaging with the unit at such points on the base as are normally not readily accessible. For instance one fastening element normally is covered by the scale platform and the other fastening is disposed beneath the base with headed portions to act as a foot for the scale base.

The invention is illustrated in the drawings of which

Fig. 1 is a plan view partly in section with the platform broken away.

Fig. 2 is a vertical section taken on the line 2—2 of Fig. 1.

Fig. 3 is a transverse section taken on the line 3—3 of Fig. 1 showing one form of bearing.

Fig. 4 is a transverse section taken on the line 4—4 of Fig. 1 showing another form of bearing.

The preferred form of scale, as illustrated, comprises a base formed of metal plates such as 10, arranged rectangularly. These plates have top flanges 11 projecting inwardly and have bottom flanges such as 12 at those portions where the bearing members are located. A scale head 13 is disposed at one end of the base and contains a bracket frame 14 supporting a dial shaft 15 on which a dial drum 16 is fastened adjustably by a collar 17 fastened to the drum by means of screws 18 and to the shaft by means of a set screw 19.

The rear end of shaft 15 is provided with a pinion 20, engaged by a rack bar 21 mounted on the end 22 on one of the scale levers 23. A spring 24 extends from the end 22 of the lever to the bracket frame 14.

The periphery 25 of the drum 16 is of varying diameter and is illustrated as being bevelled or tapered, and disposed thereon is a dial strip 26. This taper is shown exaggerated for purposes of clarity. The top of the scale head 13 is provided with a slot 27 above and in line with the periphery of the drum 16 through which slot the dial strip 26 can be read by a person standing on the scale and looking downward.

The lever 23 opposite the end 22 is provided with forked branches 28 and 29, each provided with knife edges or bearing elements 30 and 31. The lever system of the scale also comprises another lever 32 provided with forked branches 33 and 34, each of which is provided with bearing elements such as knife edges 35 and pins 36. A platform 37 has dependent legs 38, the lower faces of which are provided with removable bearing plates 39 adapted to rest on the knife edges 30 and 35. The front end of the lever 32 is provided with a pin 40 resting in the bottom of a bearing ring 41 supported in the usual manner (not shown), from the middle portion of the lever 23.

The knife edges 31 at the pivoted end of lever 23 are adapted to be supported in the manner shown in Fig. 4. As therein shown, the knife edge 31 rests on the notched upper face of a bearing block 42 fastened by screws 43 to the bottom of a bearing casing 44 which is preferably rectangular and hollow and fits snugly within the base plate 10 between the top and bottom flanges 11 and 12 thereof. A side wall such as 45 of the casing is provided with an aperture 46 through which the knife edge 31 can project. The casing 44 is preferably fastened to the top flange 11 by screws 47. The bottom of the casing is fastened to the bottom flange 12 by means of a threaded stem 48, the lower end of which is enlarged in the form of a head or knob 49 acting as a foot for the base.

The construction shown in Fig. 3 illustrates the type of bearing preferably employed for the end of the lever 32 where it is connected to the base and in this construction the casing 44 is mounted between flanges 11 and 12, and fastened thereto in the manner just described. In this form of bearing, however, the knife edge 36 or pin, as the case may be, projects through the aperture 46 in the casing and rests on the bottom of a bearing ring 50 which is suspended from a bearing pin 51 having a head 52 at one end thereof seated in a recess 53 in the wall of the casing 44 adjacent the side of base plate 10 so that when the casing is in position the head 52 of the pin 51 is covered.

In the construction and assembly of the device it is often found that the dial strips when they are being cut and fastened into endless bands vary slightly in length. This variation, however, under the present invention forms no obstacle because if the band is a little larger than normal it will slide a little further on to the tapered periphery of the drum 16, whereas if it is a little shorter than normal it will not slide quite so far on the drum before it finds a snug seat. The strip can be fastened to the drum in any manner such as by gluing or cementing. It is possible to compensate for slight lateral variations in the position on the strip by adjusting the drum longitudinally of the shaft 15, by means of collar 17.

With regard to the bearing constructions shown in Figs. 3 and 4, it is apparent that the bearing units are snugly housed between the top and bottom flanges of the base plates and are securely fastened thereto at points which are not normally readily accessible to the user of the scale and consequently not so likely to be tampered with as if the fastening elements were disposed on the side walls of the base plate in full view. The top fastening elements are normally disposed under the surface of the platform 37 and the bottom fastening elements are disposed beneath the flange 12 acting as feet not normally visible when the scale is in use. When the bearing is in the form shown in Fig. 3 in which a suspension ring is employed, the pin supporting the ring cannot be removed because its head is housed in a recess closed by the wall of the base plate. It is immaterial whether the bearing units employ knife edges and bearing blocks, as shown in Fig. 4, or pins suspended from rings, as shown in Fig. 3, although it is preferable to have the bearing units either all of the ring suspension type or, as shown in Fig. 1, have one set of the ring suspension type and the other, preferably the bearing of the longer lever 23, of the knife edge-bearing block type.

I claim:

1. In a scale, a dial strip having a slightly variable length, and a support for said strip, the supporting surface thereof being tapered slightly to receive said strip regardless of a slight variation in the length of the strip.

2. In a scale, a dial strip having a slightly variable length, and a drum adapted to support said strip on its periphery, the periphery being slightly tapered to receive and support the strip regardless of a slight variation in the length of the strip.

3. In a scale, a dial strip having a slightly tapered outline, and a drum adapted to support said strip, the periphery of the drum being slightly tapered to correspond to the taper of the dial strip, thus providing a snug seat for said strip regardless of a slight variation in the length of the strip.

Signed at New York city, in the county of New York, and State of New York, this 1st day of March A. D. 1927.

JOHN W. ROCKEFELLER, Jr.